US012570016B2

(12) United States Patent
Brormann

(10) Patent No.: US 12,570,016 B2
(45) Date of Patent: Mar. 10, 2026

(54) HAIRCUTTER FOR TRIMMING AND STYLING HAIR OF THE HEAD

(71) Applicant: The Calligraphy Cut Company GmbH, Oelde (DE)

(72) Inventor: Frank Brormann, Oelde (DE)

( * ) Notice: Subject to any disclaimer, the term of this patent is extended or adjusted under 35 U.S.C. 154(b) by 486 days.

(21) Appl. No.: 17/788,280

(22) PCT Filed: Dec. 22, 2020

(86) PCT No.: PCT/EP2020/087656
§ 371 (c)(1),
(2) Date: Jun. 22, 2022

(87) PCT Pub. No.: WO2021/130240
PCT Pub. Date: Jul. 1, 2021

(65) Prior Publication Data

US 2023/0033228 A1 Feb. 2, 2023

(30) Foreign Application Priority Data

Dec. 23, 2019 (DE) .................... 10 2019 135 673.3

(51) Int. Cl.
*B26B 21/10* (2006.01)
*B26B 21/40* (2006.01)
*B26B 21/52* (2006.01)

(52) U.S. Cl.
CPC .......... *B26B 21/10* (2013.01); *B26B 21/4075* (2013.01); *B26B 21/525* (2013.01)

(58) Field of Classification Search
CPC ... B26B 21/10; B26B 21/4075; B26B 21/525; B26B 21/12; B26B 5/00; B26B 5/006; B26B 21/00; B26B 21/52
See application file for complete search history.

(56) References Cited

U.S. PATENT DOCUMENTS 833,767 A * 10/1906 Arnold .................... B26B 21/52 30/47
854,915 A * 5/1907 Speece ................ B24D 15/105 30/DIG. 6

(Continued)

FOREIGN PATENT DOCUMENTS

DE 941118 C 4/1956
WO 2018178235 A1 10/2018

OTHER PUBLICATIONS

Translation of International Search Report issued for PCT/EP2020/087656.

(Continued)

*Primary Examiner* — Jonathan G Riley
(74) *Attorney, Agent, or Firm* — R. Dabney Eastham

(57) ABSTRACT

A haircutter (1) comprises a blade head (2), a grip, (10) and a haircutting blade (4) comprising a cutting edge (14) accommodated in the blade head (2). The blade head (2) comprises two blade head sections (201, 202) removably coupled to one another by means of a blocking device (200). The blocking device (200) comprises a locking mechanism (203) operable by an operating member (204). The operating member (204) is provided by at least part of the grip (10). Actuating the operating member (204) causes the locking mechanism (203) to shift from an operating position to an off position, to allow releasing the coupled blade head sections (201, 202) from one another.

23 Claims, 5 Drawing Sheets

(56) References Cited

U.S. PATENT DOCUMENTS

Figure 1:
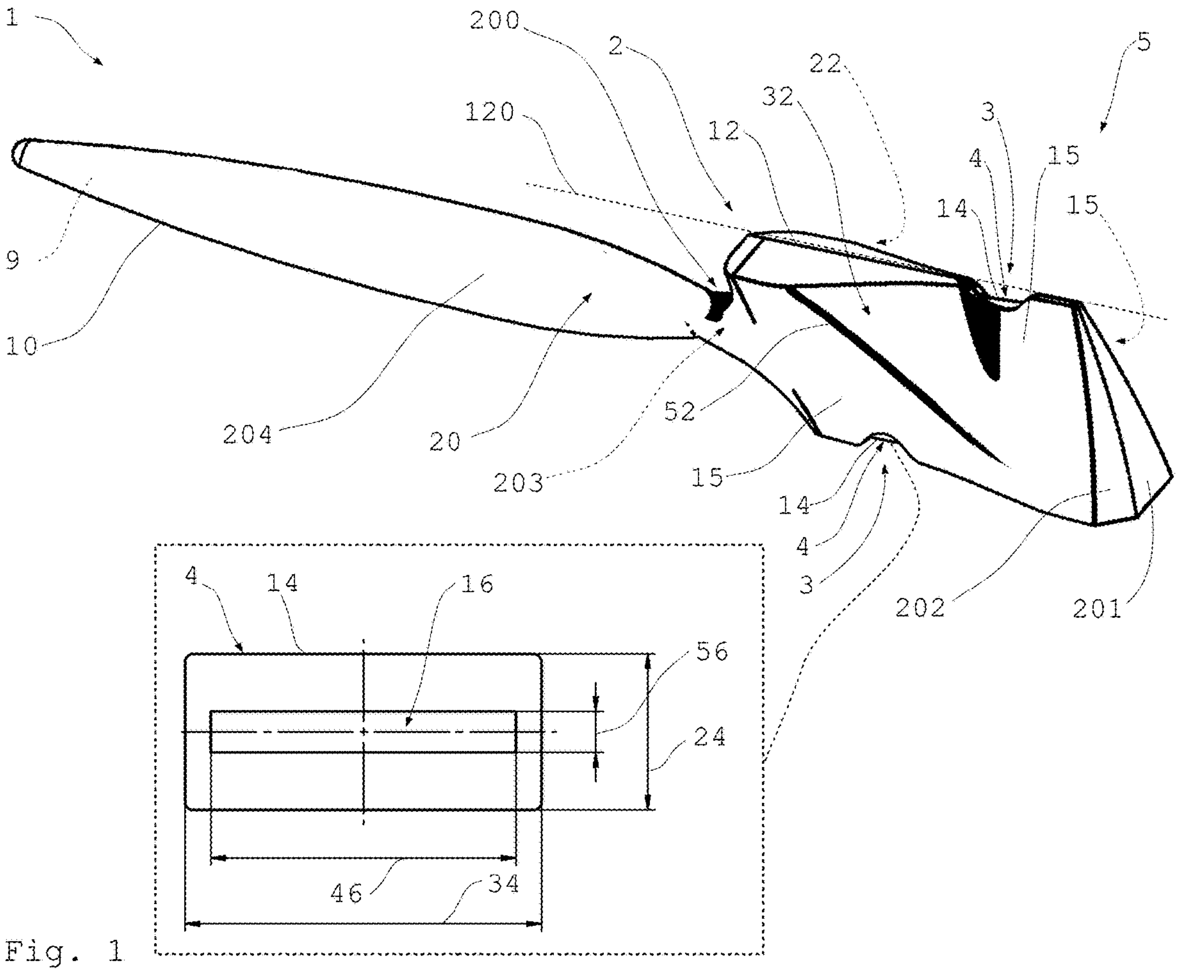

| | | | | | |
|---|---|---|---|---|---|
| 856,172 | A * | 6/1907 | Meehan | B26B 21/10 | 30/54 |
| 907,424 | A * | 12/1908 | Truitt | B26B 21/10 | 30/83 |
| 919,910 | A * | 4/1909 | Meehan | B26B 21/10 | 30/41.7 |
| 1,064,101 | A * | 6/1913 | Smith | B26B 21/10 | 30/55 |
| 1,257,179 | A * | 2/1918 | Berst | B26B 5/006 | 30/338 |
| 1,331,243 | A * | 2/1920 | Cowan | B26B 21/12 | 30/331 |
| 1,365,176 | A * | 1/1921 | Knudtson | B26B 21/10 | 30/83 |
| 1,439,059 | A * | 12/1922 | Blum | B26B 21/10 | 30/53 |
| 1,991,289 | A * | 2/1935 | Moses | B26B 21/00 | 30/53 |
| 2,221,730 | A * | 11/1940 | Vulich | B26B 21/10 | 30/59 |
| 2,704,886 | A * | 3/1955 | Finelli | B26B 21/12 | 30/531 |
| 2,707,830 | A * | 5/1955 | Mccoll | B26B 5/006 | 279/57 |
| 2,766,471 | A * | 10/1956 | Mckenzie | B26B 5/00 | 30/169 |
| 2,814,865 | A | 12/1957 | Sunich | | |
| 2,858,608 | A * | 11/1958 | Willhelm | B26B 21/12 | 30/55 |
| 3,238,616 | A * | 3/1966 | Eweson | B26B 21/12 | 30/30 |
| 3,358,367 | A | 12/1967 | Bartley | | |
| 4,037,322 | A * | 7/1977 | Bresler | B26B 21/525 | 30/53 |
| 4,180,909 | A * | 1/1980 | Lind | B26B 5/00 | D7/650 |
| 5,220,728 | A * | 6/1993 | Ueno | B26B 21/12 | 30/53 |
| D842,541 | S | 3/2019 | Brormann | | |
| 10,464,227 | B2 | 11/2019 | Brormann | | |
| 10,850,411 | B2 | 12/2020 | Brormann | | |
| 2006/0085986 | A1 | 4/2006 | Lee | | |
| 2021/0129363 | A1 | 5/2021 | Brormann | | |

OTHER PUBLICATIONS

Search report (Recherchebericht) issued for DE 10 2019 135 673.3.

* cited by examiner

HAIRCUTTER FOR TRIMMING AND STYLING HAIR OF THE HEAD

The present invention relates to a haircutter for trimming and styling hair of the head, comprising at least one grip and at least one blade head connected with the grip. The blade head accommodates at least one haircutting blade having at least one cutting edge.

Cutting hair of the head by means of such a haircutter offers as a rule many advantages over cutting hair by means of scissors. While the recessed working section provides particular safety in handling during cutting, blade changes may present a source of danger. In particular decoupling the blade head sections for removing or inserting the haircutting blade from or into the blade head requires as a rule great care to prevent cutting injuries.

In view of this it is the object of the present invention to improve the handling of such a haircutter and in particular to provide greater ease and safety for blade changes.

This object is solved by a haircutter comprising the features of claim 18. Preferred features are the subjects of the subclaims. Further advantages and features can be taken from the general description of the invention and the description of the exemplary embodiments.

The haircutter according to the invention serves for trimming and styling hair, preferably hair of the head. The haircutter comprises at least one blade head and at least one grip, which is in particular disposed on the side of the blade head. The grip in particular comprises, or is configured as, an elongated shaft. At least one longitudinal face of the blade head shows at least one working section disposed thereat. The working section is recessed from the alignment line of the longitudinal face. The blade head can accommodate at least one haircutting blade comprising at least one cutting edge. The haircutting blade can be disposed in the blade head so that its cutting edge is at least partially exposed in the working section and does not protrude beyond the alignment line. The blade head comprises at least two blade head sections provided to be removably coupled to one another by means of at least one blocking device. The blade head comprises at least one first blade head section and at least one second blade head section. The blocking device comprises at least one locking mechanism. The locking mechanism can be operated in particular manually by means of at least one operating member. The operating member is provided by at least part of the grip, in particular by the grip itself. Actuating the operating member at least once causes the locking mechanism to shift at least from at least one operating position to at least one off position, to allow releasing the coupled blade head sections from one another. The locking mechanism comprises in particular at least one safety member, which can be locked by means of the operating member to the second blade head section so as to assume the operating position, and which, in the operating position, extends at least partially at least from the first blade head section into the second blade head section. The first blade head section comprises in particular at least one through hole, through which the safety member extends, so that one end of the safety member is connected with the grip, and the other of the ends of the safety member can be connected with the second blade head section.

The haircutter according to the invention offers many advantages. A considerable advantage is provided by the blocking device and its actuating by way of the operating member incorporated in the grip. This allows fast and comfortable blade changes which are also particularly safe. At the same time, such a blocking device does not adversely affect the particular ergonomics and handling of the haircutter. A particular advantage is the fact that the invention can be implemented structurally simple and economically, and it is particularly error-proof.

Preferably, actuating the operating member at least once causes the locking mechanism to shift from the off position to the operating position, so as to couple the blade head sections together. This allows to also utilize the advantages of the invention for coupling the blade head sections after inserting the blade. In the operating position, the blade head sections are coupled to one another in particular provided for releasing but not inadvertently respectively not without actuating the operating member. In the operating position the blade head sections are in particular coupled for no-tools releasing. It is also conceivable for the blade head sections to be provided for automatic shifting from the off position to the operating position, without actuating the operating member. To this end, the blade head sections are for example placed on top of one another and clicked to one another or the like.

Particularly preferably the locking mechanism is intended for actuation respectively operation by way of at least one rotary motion of the operating member. In particular can the locking mechanism be shifted from the operating position to the off position and/or from the off position to the operating position, by way of the rotary motion. The rotary motion is in particular carried out by a rotary motion of the grip. The rotary motion is in particular carried out around the longitudinal axis of the grip. The rotation axis in particular corresponds to the rotary motion of the longitudinal axis of the grip. Alternately, the rotation axis can extend in parallel to the longitudinal axis of the grip. The rotation axis is in particular parallel to the longitudinal face and/or the alignment line of the blade head and/or the cutting edge of the haircutting blade. This configuration offers a particularly advantageous actuation of the locking mechanism.

The operating member is in particular provided by at least one elongated part section of the grip. The elongated part section extends in particular over at least one quarter or at least half or at least three quarters, and preferably over the entire length of the grip. Particularly preferably the operating member is provided by the grip itself. In particular at least the part section is rotatable. Preferably the entire grip is rotatable. It is possible for the part section of the grip to be rotatable, while the remainder of the grip remains stationary during the rotary motion. It is also possible for the operating member to be provided by at least one lever on the grip and/or at least one shifter or the like. The part section is in particular incorporated in the grip.

The locking mechanism is in particular suitable and configured to secure the second blade head section in a force fit and/or form fit to the first blade head section. In the scope of the present invention, a threaded connection is considered to be a force fit. The component provided with the threaded joint, for example the safety member described below, in particular also provides a form-fit connection between the blade head sections. It is also possible to provide the force fit and/or form fit by another suitable joint.

The locking mechanism is preferably suitable and configured to move the second blade head section to the operating position in a linear movement and/or parallel to the plane of the first blade head section. The operating position is in particular reached by way of linear movement of the second blade head section. The linear movement is in particular performed parallel to the plane of the first blade head section. The second blade head section is moved to the off position in particular by way of an opposite linear movement. Linear guiding is in particular carried out by means of a safety member of the locking mechanism and/or by a form-grip device, as they are described in more detail below. This offers particular comfort and ease in safely releasing or attaching the blade head sections. Other motions, such as pivoting motions, are likewise possible.

In a particularly advantageous configuration, the operational attachment of the grip to the first blade head section also causes the locking mechanism to simultaneously fix or secure the second blade head section to the first blade head section. In particular by fixing the second blade head section to the first blade head section, the grip is also operationally attached to the first blade head section. Attachment of the grip is in particular mechanically coupled with the locking mechanism. The blocking device in particular provides an attachment device for the grip. Actuating the operating member in particular provides for also attaching the grip to the first blade head section.

The locking mechanism comprises in particular at least one safety member. In particular for assuming the operating position, the operating member can fix, and preferably screw, the safety member to the second blade head section. The safety member extends in particular, at least in the operating position, at least from the first blade head section into the second blade head section (respectively to the second blade head section). This offers a particularly advantageous attachment of the blade head sections. In the operating position the safety member is in particular fixed to the first blade head section and to the second blade head section. The safety member is in particular fixed by means of a force-fit and/or form-fit connection. In the operating position the second blade head section is in particular fixed to the first blade head section by way of a force-fit and/or form-fit connection.

The safety member is disposed in the grip, in particular at least in sections. The safety member extends through the grip, in particular along the longitudinal axis. The safety member extends, in particular at least in the operating position, through the first blade head section into the second blade head section. The longitudinal axis of the safety member is in particular disposed parallel to, or extends along, the longitudinal axis of the grip.

The locking mechanism comprises in particular at least two coupling portions, wherein at least one coupling portion is disposed on each of the blade head sections. The safety member is in particular suitable and configured to releasably interconnect the two coupling portions. The safety member can in particular be releasably connected with the two coupling portions. The coupling portion and the blade head section are in particular interconnected integrally, preferably of one single material. The safety member is in particular provided for operation by means of the operating member.

The safety member can in particular be screwed or inserted or click-fastened or the like, at least into or to any of the two coupling portions, preferably into the coupling portion of the second blade head section (or optionally into the coupling portion of the first blade head section). The safety member can in particular be pushed through the coupling portion of the first blade head section. Alternately, another suitable mechanism may be provided, which is suitable and configured to connect the safety member with the coupling portions for no-tools release. It is possible to provide the locking mechanism suitable and configured to also attach the grip to the blade head for no-tools release.

It is preferred and advantageous for the safety member to be released, and preferably unscrewed, from the second blade head section by means of the operating member for assuming the off position. This release of the safety member causes the locking mechanism to transfer in particular from the operating position to the off position. In this way, a force-fit and/or form-fit connection of the safety member is released, at least with the second blade head section.

A particularly advantageous configuration of the safety member comprises at least one threaded portion. The threaded portion can in particular be screwed at least into the second blade head section by means of the operating member. Preferably, the threaded portion can be pushed through the first blade head section without screwing, before screwing it into the second blade head section. However, the threaded portion may be provided for screwing into the first blade head section by means of the operating member. The threaded portion can in particular be unscrewed from the first and/or second blade head section by means of the operating member. To this end, the first and/or second blade head sections in particular show a threaded region corresponding to the threaded portion. The threaded region is in particular disposed in the coupling portion. The locking mechanism is in particular configured as, or comprises at least one, screwing mechanism. The locking mechanism in particular provides at least one screwed connection. Other types of mechanism are likewise conceivable, for example a lever mechanism, or a click-in mechanism, or plug-in mechanism or the like.

Preferably, the safety member, in particular at least its threaded portion, is non-rotatably connected with the operating member. The safety member is in particular non-rotatably connected with the grip. A rotary motion of the grip in particular causes the safety member to rotate along.

In a particularly advantageous and preferred configuration, the grip, in particular at least its threaded portion, can be releasably attached to the first blade head section and/or the second blade head section by means of the safety member. The grip can in particular be attached to the coupling portion of the blade head section by means of the safety member. Preferably, the grip can be screwed to the coupling portion at least of the second blade head section by means of the safety member. The advantage thereof is that the operating member serves both to operate the locking mechanism and also to attach and release the grip to and from the blade head.

For attaching the grip, the threaded portion can in particular be screwed into the first and/or second blade head section. The blocking device is in particular suitable and configured to operate the locking mechanism by means of the operating member, and also to release and/or attach the grip to and from the blade head by means of the safety member. Attaching the grip to the first and/or second blade head section(s) may be provided additionally, or alternately, by way of at least one other connection type. To this end, for example at least one other screw thread or plug-in type connection or the like may be provided. In the operating position, a first part of the threaded portion in particular extends through the first blade head section, and a second part thereof following the first part in the longitudinal direction, extends at least partially (in particular entirely) into the second blade head section.

In an advantageous specific embodiment, the first blade head section shows at least one through hole. The safety member, preferably the threaded portion, extends in particular through the through hole (of the first blade head section), so that one end of the safety member is connected with the grip, and the other of the ends of the safety member can be connected with the second blade head section. One end of the safety member is in particular connected with the coupling portion of the first blade head section, and the other of the ends of the safety member can be connected with the coupling portion of the second blade head section. In the operating position, the other end of the safety member is in particular connected with the first and second blade head sections.

In the off position, the other end of the safety member is in particular (loosely) connected with the first blade head section only, no longer with the second blade head section. In the off position, the other end of the safety member is in particular only pushed through the first blade head section so that it can be pulled out (without screwing motions). For releasing the grip, one or the other of the ends of the safety member can preferably be released from the first blade head section, and preferably can be simply pulled out or intentionally released or unscrewed. In the off position the other end of the safety member remains in particular only loosely connected with the first blade head section. Alternately it is possible that in the off position, the other end of the safety member is secured to the first blade head section. To this end, a releasable form fit and e.g. a click-in element or a bayonet joint or the like may be provided. The advantage thereof is that in the off position, only the second blade head section needs to be removed and the other parts remain interconnected.

The through hole of the second blade head section shows at least one threaded region corresponding to the threaded portion, so that the grip can be screwed to the second blade head section by way of the threaded portion. It is also possible for the through hole of the first blade head section to comprise a threaded region corresponding to the threaded portion, so that the grip can also be screwed to the first blade head section. This offers an uncomplicated while particularly reliable attachment of the grip to the blade head.

In the operating position, the other end of the safety member extends in particular through the first blade head section to which it is not screwed, and then extends at least partially into, and is screwed to, the second blade head section.

The through hole of the first blade head section is in particular configured unthreaded and/or showing oversize in relation to the other end of the safety member. Thus, the other end of the safety member can in particular be pushed through the through hole without any screwing motion. The second blade head section (in particular its coupling portion) shows in particular at least one through hole or at least one blind hole, which is or are provided with a thread (corresponding to the threaded portion).

Preferably, the first blade head section can be pushed in the direction of the grip when the other end of the safety member is partially unscrewed from the second blade head section. Then the second blade head section remains in particular stationary relative to the grip, so that the first and second blade head sections can be pushed apart from one another. Thus, the blade head sections can be readily released from one another, so that blade changes are particularly safe. Preferably, the first blade head section is automatically pushed in the direction of the second blade head section when the other end of the safety member is screwed into the second blade head section. Then the grip is in particular urged against the first blade head section.

It is possible that in a first length of thread engagement of the threaded portion, the grip can be attached to the first blade head section. Preferably, the threaded portion can be pushed through the first blade head section absent a screwed connection. It is preferred and advantageous that after being pushed through the first blade head section (or in a second length of thread engagement of the threaded portion), the second blade head section can be attached to the first blade head section (by screwing the threaded portion into the second blade head section). The second length of thread engagement is in particular deeper than the first length of thread engagement. In the first length of thread engagement, the threaded portion extends in particular only into the coupling portion of the first blade head section, and in the second length of thread engagement, also into the coupling portion of the second blade head section. The maximum length of thread engagement of the threaded portion is in particular limited by the grip abutting the first blade head section and/or by the first blade head section abutting the second blade head section in a form-fit.

The safety member, in particular at least its threaded portion, is preferably coaxially disposed in the grip, at least in sections. The safety member extends in particular coaxially with the outer structure of the grip.

Particularly preferably, the second blade head section can be tightened against the first blade head section by means of the locking mechanism. The locking mechanism in particular provides for the haircutting blade to be clamped between the blade head sections. The form-grip device described below is in particular also provided therefor. The locking mechanism is in particular suitable and configured to move the second blade head section in a linear movement to the operating position, pressing together the blade head sections by means of the form-grip device (in particular by means of its wedge-shaped form-grip elements) transverse to the direction of the linear movement, and preferably thus to clamp the haircutting blade between the blade head sections. This offers advantages for the cutting result since in this configuration the haircutting blade is particularly firmly fixed in the blade head. The second blade head section can in particular be pulled toward the first blade head section by screwing in the safety member. The second blade head section is in particular pulled toward the grip and/or transverse to the main surface of the first blade head section.

It is possible and preferred for the blocking device to comprise at least one pre-tensioning device. The pre-tensioning device is in particular suitable and configured to urge the second blade head section away from the first blade head section by means of spring force. The pre-tensioning device can in particular be pre-tensioned by shifting the locking mechanism to the operating position. The pre-tensioning device is in particular suitable and configured, when in the off position, to urge the second blade head section away from the first blade head section. The pre-tensioning device in particular comprises at least one spring, or is configured as a spring. In particular, at least one spring steel member is disposed between the blade head sections. For example, at least one spring steel member is attached to the first and/or second blade head section(s). This enables particularly comfortable and safe blade changes. The pre-tensioning device may also be suitable and configured to secure the screwed connection of the grip with the first blade head section against undesired release.

In an advantageous specific embodiment, the blocking device comprises at least one form-grip device. The form-grip device comprises at least one form-grip member disposed on the first blade head section, and at least one corresponding form-grip member disposed on the second blade head section. Preferably, the form-grip members can be clamped together by transferring the locking mechanism to the operating position, so that the blade head sections are locked to one another in a form fit, in addition to the locking mechanism.

Preferably, the form-grip members can be released in at least one direction of release. Preferably, the form-grip members abut one another in a form-fit in at least one retaining direction. The blocking device is in particular suitable and configured to pre-tension the form-grip members by means of the locking mechanism counter to the direction of release and to urge, and in particular wedge them, against one another in a form-fit. The direction of release extends in particular opposite the direction in which the second blade head section can be tensioned against the first blade head section by means of the locking mechanism. The direction of release extends in particular opposite the retaining direction. The direction of release is in particular away from the grip in the longitudinal direction. The retaining direction is in particular opposite the direction of release.

The form-grip device in particular also provides a second retaining direction extending transverse to the direction of release and/or transverse to the longitudinal direction of the haircutter. The second retaining direction extends in particular transverse to the main plane of the blade head sections and/or transverse to the longitudinal face of the blade head and/or transverse to the longitudinal axis of the grip. The second retaining direction extends in particular in the direction in which the two blade head sections can be lifted off each other. In the off position, the form fit in the second retaining direction is preferably lifted, so that the two blade head sections can be lifted off each other.

The form-grip device is in particular incorporated in the blade head. The form-grip members are in particular configured integrally with the pertaining blade head section. The form-grip members are in particular wedge-shaped. The form-grip members can in particular be wedged together by transferring the locking mechanism to the operating position. The form-grip member in particular reaches beneath the corresponding form-grip member and/or reversely.

Preferably, the haircutter comprises at least one adjusting device for aligning the haircutting blade in the blade head. The adjusting device in particular comprises at least one adjusting unit provided for engaging at least partially in at least one recess in the haircutting blade. Preferably, the adjusting unit is provided by at least one of the form-grip members of the form-grip device. In particular at least one form-grip member of the first blade head section and at least one form-grip member of the second blade head section each provide at least one adjusting unit. This configuration is particularly compact and space-saving since the haircutting blade is oriented at the components of the blocking device. In the operating position, the form-grip member preferably extends through the recess in the haircutting blade. In the operating position, in particular both of the form-grip members extend through the recess in the haircutting blade. The adjusting device may comprise at least one take-up cavity for the haircutting blade incorporated in a blade head section. The take-up cavity is in particular adapted to the outer contour of the haircutting blade, so that the haircutting blade can be accommodated in the take-up cavity in a form-fit.

The form-grip member and/or the adjusting unit are configured in particular integrally with the pertaining blade head section. It is also possible for the form-grip member and/or the adjusting unit to be configured separately from the pertaining blade head section and to be firmly, releasably or permanently, connected with the pertaining blade head section. What is conceivable is for example, a screwed connection, rivet connection, glued connection, crimp connection, and/or a plug-in type connection.

The blade head comprises in particular two side faces, a front face and a rear face. The blade head sections provide one side face each. The blade head sections provide in particular half of one side of the working section. The blade head comprises at least two working sections which are disposed on opposite longitudinal faces of the blade head. The working sections are in particular disposed diagonally offset on opposite longitudinal faces. The blade head sections are in particular configured plate-like. In the operating position, the blade head sections in particular abut each other with their main surfaces.

The longitudinal axis of the grip extends in an imaginary line, in particular through the blade head in the longitudinal direction and/or in a main plane of the blade head. The longitudinal axis of the grip extends in particular along an imaginary line in a plane between the blade head sections in which preferably the haircutting blade can be accommodated as well. The longitudinal axis of the grip extends along an imaginary line, in particular in a main plane of the haircutting blade. The longitudinal axis of the safety member preferably extends like that of the grip.

The grip is in particular disposed laterally on a side face of the blade head and preferably of the first blade head section. The side face is disposed in particular transverse to the longitudinal face having the at least one working section. The longitudinal axis of the grip extends in particular in an imaginary line in parallel to the longitudinal face, and preferably transverse to the side face. The longitudinal side of the blade head is in particular aligned in parallel to the longitudinal axis of the grip. The grip is in particular disposed laterally on the blade head so that the cutting movements take place along the longitudinal axis of the grip. The blade head is in particular not placed transverse on the grip. The longitudinal faces of the blade head and the longitudinal axis of the grip are in particular oriented in the same direction. The longitudinal faces of the blade head and the longitudinal axis of the grip in particular show the same main orientation.

In the scope of the present invention, parallel extensions or configurations in the plane may show deviations which may be up to 10° or up to 15° or up to 30°. It is particularly preferred for the longitudinal axis of the grip to be disposed in an imaginary line, not transverse, and in particular not orthogonal, or not at a 45° angle, to the main plane of the blade head. In the scope of the present invention, instead of an orientation in the plane, an orientation in parallel to the plane is also possible.

A haircutter advantageously suitable for use with the invention is described in the international application PCT/EP2018/058073. The entire disclosure of PCT/EP2018/058073 is hereby included by reference in the disclosure content of the present application.

The blade head consists in particular of the at least two blade head sections. The blade head sections are in particular separate parts. The blade head sections are in particular configured as one piece, preferably of one single material. It is also possible for the blade head to comprise, in addition to the at least two blade head sections, at least one supporting structure to which the grip and at least the first blade head section and/or the second blade head section can be attached.

Particularly preferably, the blade head and/or the grip are at least partially made of stainless steel or tool steel. It is also preferred for the blade head and/or the grip to be at least partially made of a cast metal material. It is also possible and preferred for the blade head and/or the grip to be made by way of at least one additive production process.

The blade head sections are in particular entirely releasable from one another. It is also possible for the blade head sections to be interconnected in the off position in some sections. To this end, for example a hinge and/or a flexible connecting member or the like may be provided.

The first blade head section is in particular characterized in that it can be attached, or is linked, to the grip. The first blade head section in particular shows at least one grip accommodation. The second blade head section can in particular be attached to the first blade head section. The second blade head section can in particular be indirectly attached to the grip by way of the first blade head section. It is also possible for the second blade head section to be directly attached to the grip. The haircutting blade can in particular be accommodated between the blade head sections. Preferably the haircutter comprises at least one haircutting blade, preferably as it is described herein.

The applicant reserves the right to claim a haircutting blade for the haircutter described above. The haircutting blade comprises at least one cutting edge and preferably at least two cutting edges and at least one recess for an adjusting device for aligning the haircutting blade in a blade head. The width of the haircutting blade corresponds to maximally half the length of the haircutting blade. The haircutting blade is in particular configured as it has been described with reference to the haircutter.

This width to length ratio allows particular ease of inserting the haircutting blade according to the invention into a blade head having an angular placing surface and preferably into the haircutter according to the invention.

Preferably the haircutting blade shows a rectangular outer contour, in particular with rounded corners. This shape allows manufacturing the blade and a take-up cavity provided therefor in the blade head with particular dimensional consistency and also cost-effectively. This provides accommodation of the blade in the blade head with particularly little play. The corners provided may also be rectangular or non-rounded.

The recess is particularly preferably configured as a rectangular elongated hole. The rectangular elongated hole has in particular rectangular corners respectively non-rounded corners. This provides for a secure seat and close fit on the adjusting unit. The adjusting unit is in particular also configured with matching, rectangular corners or edges.

It is preferred for the recess to extend over more than 20% of the width of the haircutting blade. It is also preferred for the recess to extend over more than 75% of the length of the haircutting blade. Preferably the recess extends over more than 25% of the width and/or over more than 85% of the length. This offers a particularly firm seat of the haircutting blade in the blade head respectively on the adjusting unit. Moreover this recess allows particularly economic manufacturing of the adjusting unit required therefor, including high-precision close fit.

All the provided working sections in particular provide for one single shared haircutting blade. The haircutting blade is for example equipped with two opposite cutting edges to provide opposite working sections with one cutting edge each. The haircutting blade shows in particular at least two cutting edges, in particular on its longitudinal faces.

It is possible and advantageous for the grip to be configured in segments in respect of its longitudinal axis. The grip comprises in particular at least two axial segments and preferably at least three or at least four or more axial segments. The invention comprises in particular a system of a plurality of segments exchangeable with one another. The exchangeable segments in particular differ, at least in respect of their materials and/or surface coating and/or surface quality and/or cross sectional shape and/or length and/or at least one other geometric property and/or their weights. A number of the segments of a grip can in particular be varied by exchanging for other segments of the system. For example, a grip of three segments can thus be converted to a grip of four or more segments. Such a system allows uncomplicated and controlled customization of existing haircutters. An adaptation of the gravity point is thus likewise possible. The grip may comprise one segment only. In particular at least one segment is non-rotatably connected with the safety member and preferably with the threaded portion.

Further advantages and features of the present invention can be taken from the exemplary embodiments which will be discussed below with reference to the enclosed figures.

Figure 2:
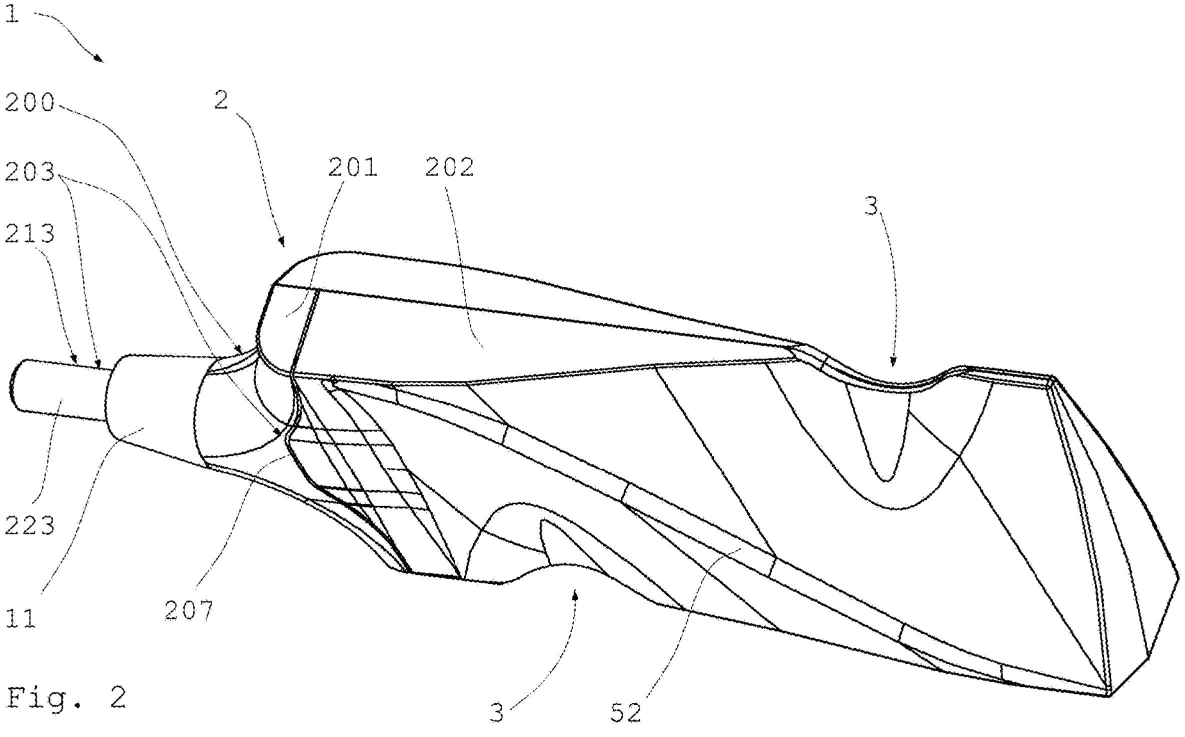
Figure 3:
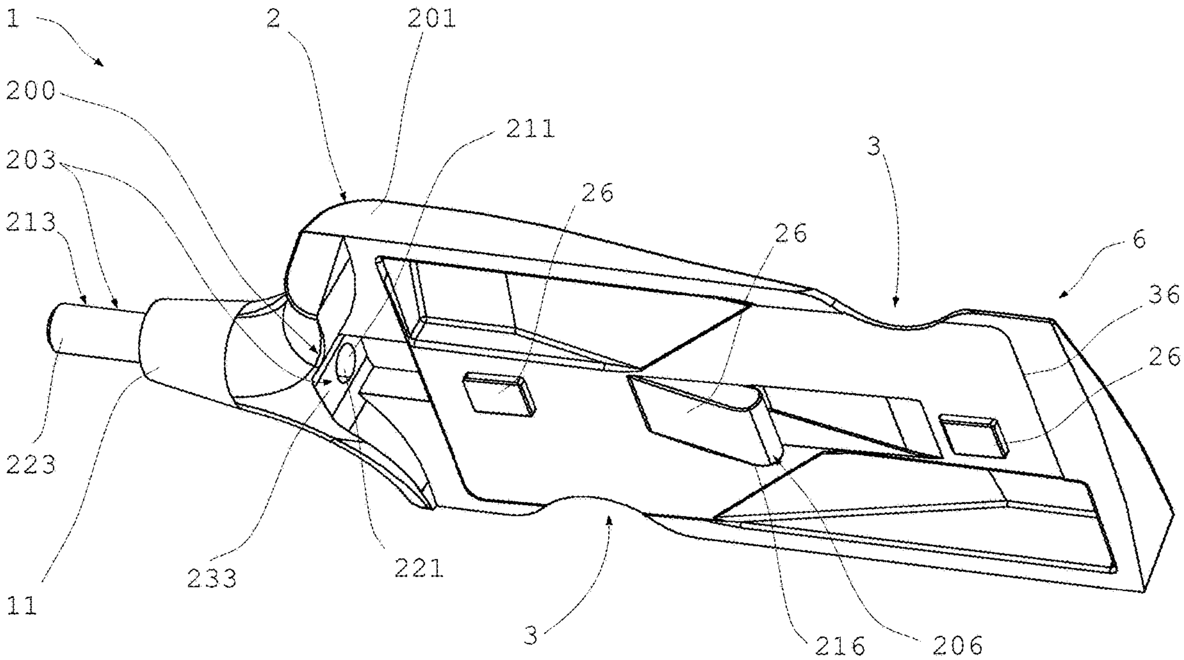
Figure 4:
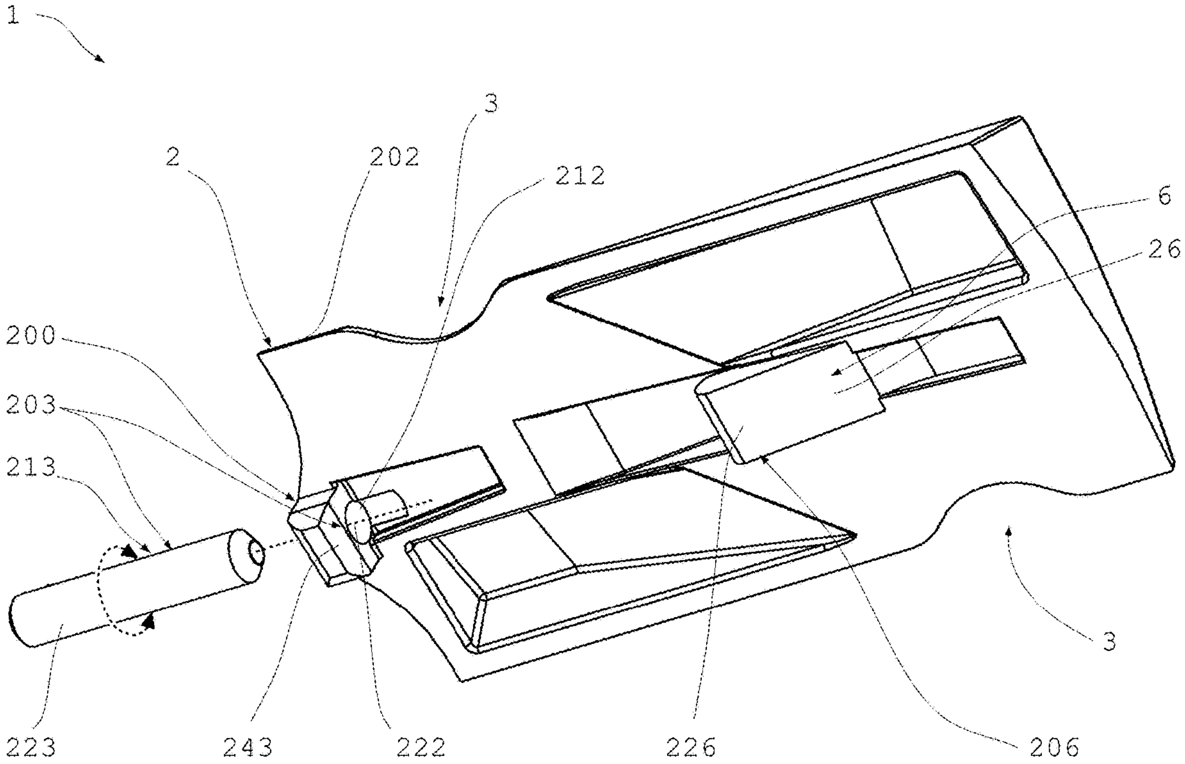
Figure 4A:
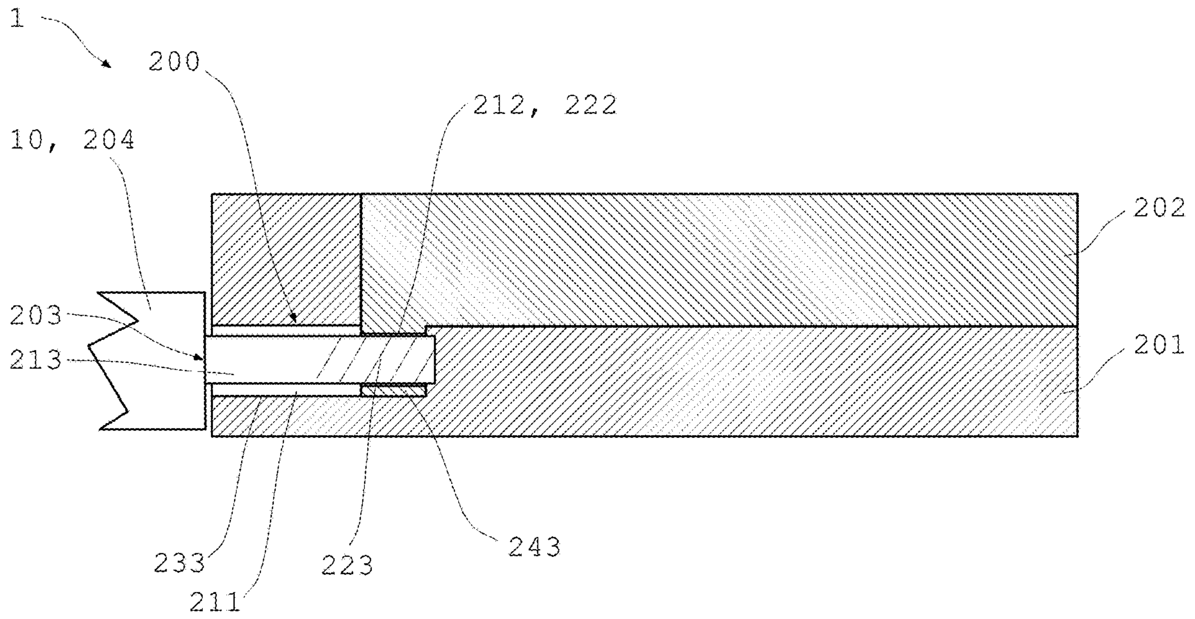
Figure 5:
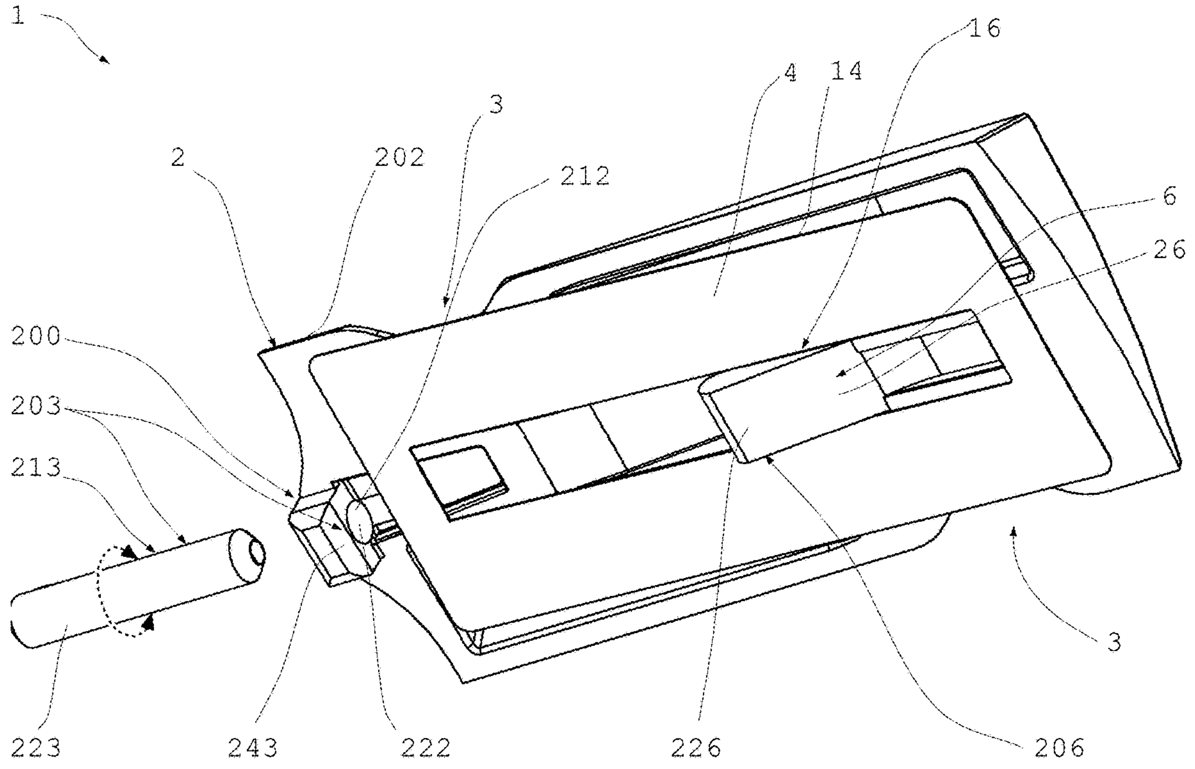
Figure 6:
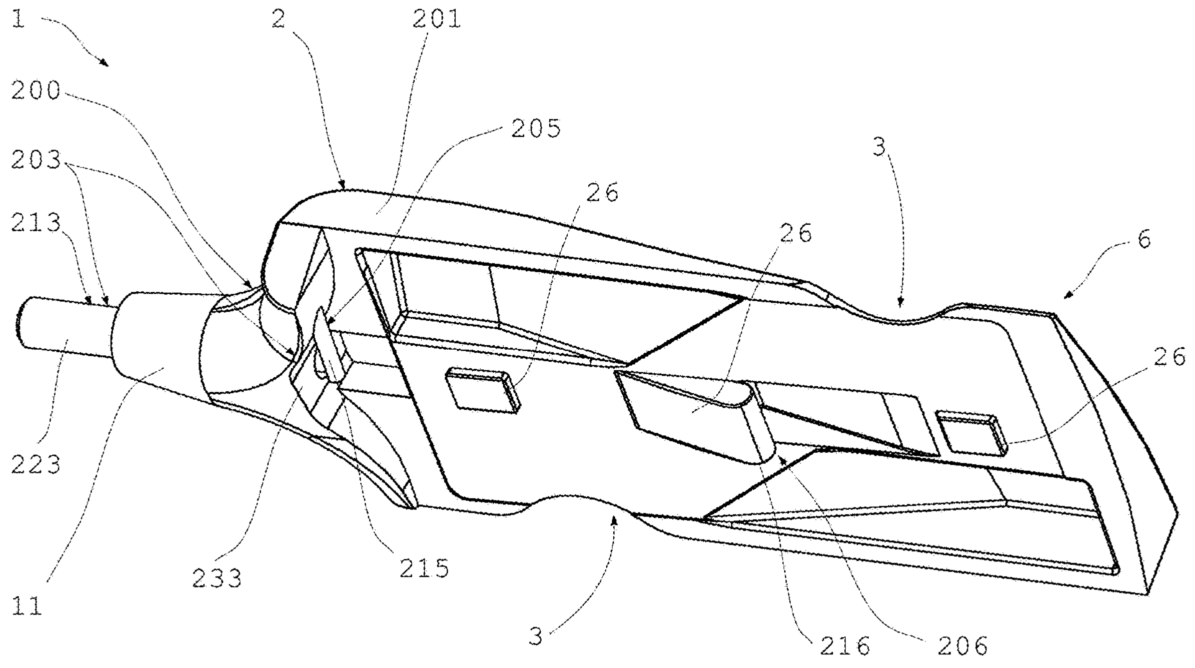
Figure 7:
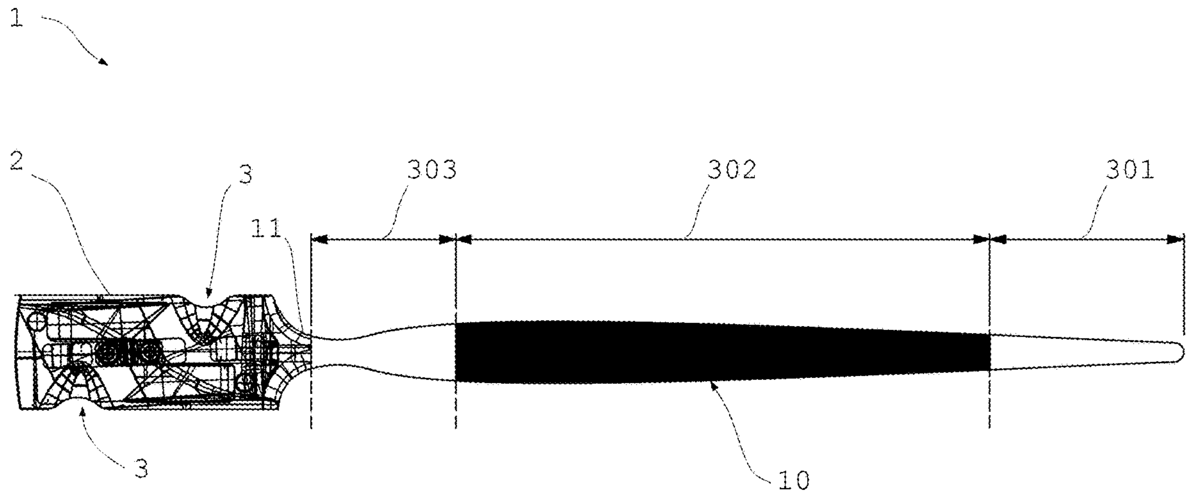
Figure 8:
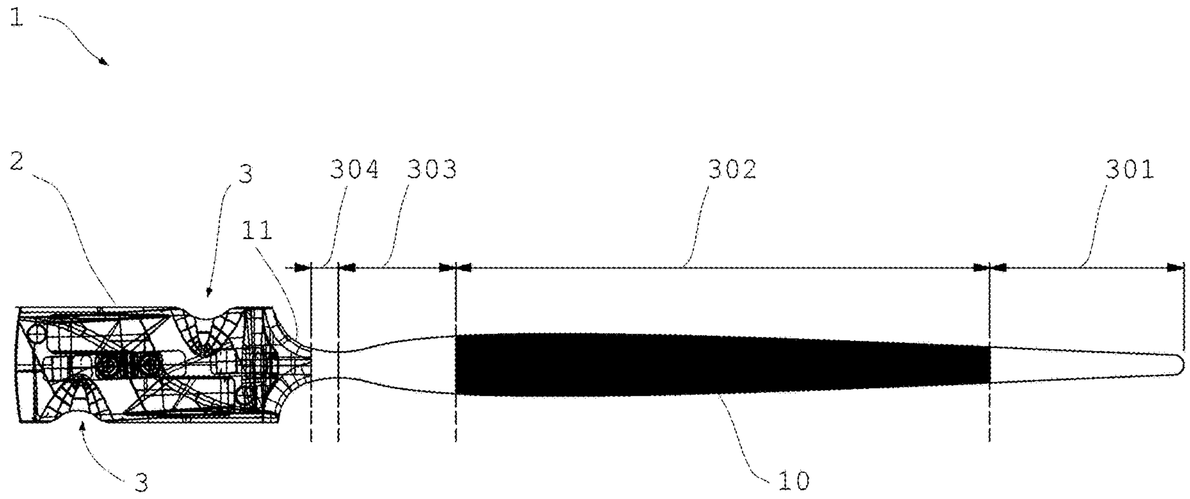

The figures show in:

FIG. 1 a purely schematic illustration of a haircutter according to the invention in a perspective view;

FIG. 2 a purely schematic detail illustration of a blade head of the haircutter in a perspective view;

FIG. 3 a schematic detail illustration of a first blade head section of the haircutter in a perspective view;

FIG. 4 a schematic detail illustration of a second blade head section of the haircutter in a perspective view;

FIG. 4A a schematic detail illustration of the blade head and grip of the haircutter in a partial sectional view;

FIG. 5 the blade head section of FIG. 4 with a haircutting blade inserted;

FIG. 6 a purely schematic detail illustration of a first blade head section of a specific embodiment of the haircutter in a perspective view;

FIG. 7 a purely schematic illustration of a configuration of the haircutter in a side view; and FIG. 8 a purely schematic illustration of another configuration of the haircutter in a side view.

FIG. 1 shows a haircutter 1 according to the invention comprising a blade head 2 and a haircutting blade 4 accommodated therein. A grip 10 is attached to the side of the blade head 2 so that the longitudinal axes of the grip 10 and the blade head 2 are oriented in the same direction.

The blade head 2 comprises two opposite working sections 3 offset to one another which are recessed relative to an alignment line 120 of a longitudinal face 12. The haircutting blade 4 comprises two opposite cutting edges 14, each of which is accessible in one working section 3 only. The recess of the working sections 3 is configured bent.

The blade head 2 comprises two blade head sections 201, 202 between which the haircutting blade 4 is accommodated. The first blade head section 201 is connected with the grip 10 by means of a grip accommodation 11. The second blade head section 202 is attached to the first blade head section 201 for which it serves as a cover. The two blade head sections 201, 202 rest flush against one another on the longitudinal faces 12.

Each of the blade head sections 201, 202 provides a side face 22, 32 of the blade head 2. Each of the side faces 22, 32 shows a substantially diagonal elevation 52 which separates the two opposite working sections 3 from one another.

The blade head 2 comprises a guiding device 5 which guides the hair during cutting at a defined angle along the blade head 2. The guiding device 5 provides two placing surfaces 15 for each of the working sections 3. Thus, each of the working sections 3 is provided with one placing surface 15 on each of the side faces 22, 32. The placing surfaces 15 on the side face 22 are not visible in this illustration.

The two placing surfaces 15 disposed on one shared side face 22, 32 are separated from one another by the elevation 52.

The guiding device 5 is configured integrally with the blade head 2. This provides the placing surfaces 15 in a wedge-shaped design of the blade head 2 or its blade head sections 201, 202.

The grip 10 and the blade head 2 show one shared balancing point 20 disposed in the grip 10. The grip 10 is e.g. provided with a hollow space which can accommodate a counterweight 9, not shown. This is for example a lead weight 9 having such a weight as to obtain a grip 10 having the same weight as does the blade head 2. Then the haircutter 1 is in equilibrium or in a level position as it rests on the balancing point 20.

The longitudinal axis of the blade head 2 extends in parallel to the longitudinal faces 12 respectively to the alignment line 120 and centrally through the grip 10, and through the central main plane of the blade head 2 and also of the haircutting blade 4. The side faces extend transverse to the longitudinal axis. The grip accommodation 11 is disposed on one of the side faces 123, so that the grip 10 can be accommodated on the side of the blade head 2.

To insert or change the haircutting blade 4, or to reverse it so that an unused cutting edge 14 lies in the working section 3, the second blade head section 202 can be taken off the first blade head section 201. The haircutter 1 is equipped with a blocking device 200 for particularly safe and comfortable blade changes. The blocking device 200 comprises a locking mechanism 203, not visibly disposed in the interior, which, by means of an operating member 204, can be shifted from an operating position to a off position and reversely.

In the operating position, the blade head sections 201, 202 are firmly coupled to one another, as shown. In the off position, the blade head sections 201, 202 are decoupled from one another, so that the second blade head section 202 can be removed from the first blade head section 201, and the haircutting blade 4 is comfortably and safely accessible. Here the operating member 204 is provided by the grip 10. Rotating the grip 10 shifts the locking mechanism 103 from the off position to the operating position and reversely.

FIG. 2 illustrates the blade head 2 in more detail. For the sake of clarity, the grip 10 is not shown.

FIG. 3 shows the inner side of the first blade head section 201 opposite the side face 22. On this side the adjusting device 6 for aligning the haircutting blade 4 and parts of the blocking device 200 can be particularly clearly recognized.

The adjusting device 6 comprises three adjusting units 26 disposed in the first blade head section 201. The adjusting units 26 engage in a recess 16 of the haircutting blade 4, as shown in detail in the FIG. 5. Thus, movement of the haircutting blade 4 in its longitudinal direction and also transverse to its longitudinal direction is blocked by way of form-fit.

The adjusting device 6 moreover comprises a take-up cavity 36 recessed in the blade head section 201 matched to the outer contour of the haircutting blade 4. The depth of the take-up cavity 36 corresponds at least approximately to the thickness of the haircutting blade 4. This is another way of blocking undesired movement of the haircutting blade 4.1

The adjusting device 6 is disposed at an angle or inclination to the longitudinal axis 42 of the blade head 2. Thus, the inserted haircutting blade 4 is aligned by its cutting edges 14 at a defined angle to the longitudinal axis respectively to the longitudinal faces 12 of the blade head 2. The angle of the inclined position is for example 3°.

FIG. 4 shows the inner side of the second blade head section 202 opposite the side face 32. Here, the parts of the adjusting device 6 and of the blocking device 200 corresponding to the first blade head section 201 can be particularly clearly recognized.

FIG. 5 shows the blade head section 202 described with reference to the FIG. 4, with a haircutting blade 4 inserted as intended.

The blocking device 200 will now be described with reference to the FIGS. 1 to 5. The locking mechanism 203 comprises a safety member 213 with a threaded portion 223 and two coupling portions 233, 243. The first coupling portion 233 is disposed on the first blade head section 201 and the second coupling portion 243, on the second blade head section 202.

The first coupling portion 233 shows a through hole 211 with a threaded region 221 configured as an internal thread. The second coupling portion 243 likewise shows a through hole 212 with a threaded region 222 configured as an internal thread. The threaded regions 221, 222 are configured corresponding to the threaded portion 123 of the safety member 113. Thus, the safety member 213 can be screwed from the outside into the first blade head section 201 and then further into the second blade head section 202. Thus results a screwed connection securing the second blade head section 202 to the first blade head section 201 in a force-fit and also form-fit.

In the FIGS. 2 and 3 the safety member 213 is partially threaded into the first blade head section 201. The FIGS. 4 and 5 show the safety member 213 in a position in which it has not yet entered the second blade head section 202.

The operating member 104 provided here for the locking mechanism 203 is the grip 10. To this end, the grip 10 is non-rotatably connected with the safety member 113. Here the safety member 213 is incorporated centered respectively coaxially in the grip 10. The locking mechanism 103 is operated by rotating the grip 10. A rotary motion of the grip in one direction threads the safety member 213 into the blade head sections 201, 202, and a rotary motion in the opposite direction, unthreads it.

To access the haircutting blade 4 while the haircutter 1 is in the operating position, the grip 10 needs only be rotated out of the blade head 2, for example anti-clockwise. As soon as the safety member 213 is unscrewed from the coupling portion 243 of the second blade head section 202, the second blade head section 202 can be removed, and the blade is safely accessible.

Rotating the grip 10 further in the same direction causes the safety member 213 to rotate further and finally entirely out of the first blade head section 201. In this way, the grip 10 with the safety member 213 can be released from the blade head 2 together.

For attaching the grip 10 to the blade head 2, the grip is rotated in the other direction, and the safety member 213 is screwed back into the first blade head section 201. In a first length of thread engagement the safety member 213 does not yet extend out of the coupling portion 233, so that the second blade head section 202 can be placed onto the first blade head section 201.

As the grip 10 is rotated further, the length of thread engagement increases and the safety member 213 extends into the coupling portion 243 of the second blade head section 202. By correspondingly rotating the grip 10, the screwed connection is tightened and the second blade head section 202 is tensioned against the first blade head section 201.

The blocking device 200 comprises a form-grip device 206 including a form-grip member 216 in the first blade head section 201, and a corresponding form-grip member 226 in the second blade head section 202. The form-grip device 206 causes the blade head sections 201, 202, in the operating position, to be secured in a form-fit, in addition to the screwed connection of the safety member 213. At the same time, the haircutting blade 4 is also tightly clamped.

Shifting the locking mechanism 203 to the operating position causes the second blade head section 202 to be pulled toward the first blade head section 201, as described above. Then the form-grip members 216, 226 are also pulled toward one another so that they are wedged. This achieves a particularly tight seat of the blade head sections 201, 202 without play. At the same time the haircutting blade 4 is clamped particularly firm or tight, so as to achieve a particularly good cutting performance. The form-grip members 216, 226 are configured integrally with the pertaining blade head section 101, 202.

To lift the form fit, the second blade head section 202 must be removed from the first blade head section 201 in the longitudinal direction and in a direction facing away from the grip 10. Opposite this direction of release and also transverse to this direction of release, the form fit is achieved by the form-grip members 216, 226. The form-grip members 216, 206 and 20 are configured in a wedge shape, so that one of the form-grip members 216 can reach beneath the other of the form-grip members 226 and reversely.

The form-grip members 216, 226 each also establish an adjusting unit 26 of the adjusting device 6. To this end, the form-grip members 216, 226 are configured and disposed so that in the operating position, they extend through the recess 16 in the haircutting blade 4.

The form-grip members 216, 226 or the adjusting unit 26 are configured integrally with the pertaining blade head section 201, 202. Preferred is also a configuration in which the form-grip members 216, 226 or the adjusting unit 26 are configured separate from the pertaining blade head section 201, 202, and connected with the pertaining blade head section 201, 202 releasably or permanently. A screwed connection is for example provided.

FIG. 6 shows the first blade head section 201 of the haircutter 1, substantially corresponding to the blade head section 201 shown in FIG. 3. Additionally, a pre-tensioning device 205 with a spring 215 of spring steel is provided. The spring 215 is pre-tensioned by shifting the locking mechanism 203 to the operating position. Then when the locking mechanism 203 is released and shifted to the off position, the spring 215 urges the second blade head section 202 away from the first blade head section 201. This provides the user with a haptic signal that the off position has been reached, and the second blade head section 202 can now readily be removed from the first blade head section 201.

FIG. 1 shows in the area in dashed lines, a top view of the haircutting blade 4. The haircutting blade 4 is provided with two opposite cutting edges 14. This haircutting blade 4 is rectangular with rounded corners.

In the side face of the haircutting blade 4 the recess 16 is formed which is configured as a rectangular, elongated hole. The elongated hole shows rectangular or non-rounded corners. The length 46 of the recess 16 corresponds to the distance of the two outer adjusting units 26 of the adjusting device 6 of the blade head 2. The width 56 of the recess 16 corresponds to the width of each of the adjusting units 26.

The haircutting blade 4 shows a width 24 showing a ratio of 1:2.29 to the length 34. The width 24 is for example 19 mm. The length 34 is for example 43.5 mm. The thickness of the haircutting blade 4 is for example 0.1 mm. The width 56 of the recess 16 is for example 5 mm and the length 46 is 37.2 mm.

These dimensions of the haircutting blade 4 are particularly suitable for the haircutter 1 described above, since they provide particularly advantageous angles for the placing surfaces 15 without making the blade head 2 bulky.

FIGS. 7 and 8 show the haircutter 1 with a grip 10, which is configured in segments in respect of its longitudinal axis. The grip 10 according to FIG. 7 comprises three axial segments 301-303. The grip 10 according to FIG. 8 comprises four axial segments 301-304. The segments 301-304 of a grip 10 consist of different materials, e.g. stainless steel, wood, and/or plastic, and/or they differ in their surface properties, e.g. by their colors. In particular at least one of the segments 301-304 is non-rotatably connected with the safety member 213 and preferably with the threaded portion 223.

The grips 10 shown are in particular parts of a system comprising a plurality of segments 301-304 provided for exchanging with one another. For example, a second segment 302 of stainless steel can be replaced by another second segment 302 of the system, e.g. of wood or plastic. Exchanging the segments 301-304 also allows varying the number of segments 301-304. For example, the third segment 303 of the grip 10 according to FIG. 7 may be replaced by two shorter segments 303, 304, as shown in FIG. 8. The total length of the grip 10 remains unchanged.

For example, in the FIG. 7 the length of the first segment 301 is 39 mm, the length of the second segment 302 is 107.2 mm, and the length of the third segment 303 is 29 mm. For example in the FIG. 8, the first and second segments 301, 302 show the same length. The third segment 303 for example shows a length of 23.5 mm. The fourth segment 304 for example shows a length of 5.5 mm.

A particular advantage of the blocking device presented is that in the operating position the blade head sections 201, 202 are pulled particularly close to one another. This allows to comply with a desired gap width and to effectively avoid uneven distances or a play of the blade head sections 201, 202. FIG. 2 shows a separation line 207 between the blade head sections 201, 202 where a particularly narrow distance between components is provided. The tightening of the second blade head section 202 against the first blade head section 201 nearly eliminates any gap in the separation line 207. The separation line 207 shows a convex contour of the second blade head section 202, and a concave contour, of the first blade head section 201. This also achieves a particularly narrow gap width.

LIST OF REFERENCE NUMERAL

1 haircutter
2 blade head
3 working section
4 haircutting blade
5 guiding device
6 adjusting device
9 counterweight
10 grip
11 grip accommodation
12 longitudinal face
14 cutting edge
15 placing surface
16 recess
20 balancing point
22 side face

24 width
26 adjusting unit
32 side face
34 length
36 take-up cavity
46 length
52 elevation
56 width
120 alignment line
200 blocking device
201 blade head section
202 blade head section
203 locking mechanism
204 operating member
205 pre-tensioning device
206 form-grip device
207 separation line
211 through hole
212 through hole
213 safety member
215 spring
216 form-grip member
221 threaded region
222 threaded region
223 threaded portion
226 form-grip member
233 coupling portion
243 coupling portion
301 segment
302 segment
303 segment
304 segment

The invention claimed is:

1. A haircutter for trimming and styling hair of the head, comprising:

- a blade head and a grip laterally disposed on the blade head, wherein a longitudinal face of the blade head comprises a working section disposed thereat which is recessed from an alignment line of the longitudinal face, and
- wherein a haircutting blade comprising a cutting edge is accommodated and disposed in the blade head, so that the cutting edge is at least partially exposed in the working section and not protruding beyond the alignment line, wherein the blade head comprises a first blade head section and a second blade head section removably coupled to one another by means of at least one blocking device,
- wherein the blocking device comprises at least one locking mechanism operated by an operating member, and wherein the operating member comprises at least part of the grip, and wherein actuating the operating member causes the locking mechanism to shift at least from an operating position to a release position, to allow releasing the coupled first and second blade head sections from one another, and
- wherein the locking mechanism comprises a safety member, which is locked by means of the operating member to the second blade head section so as to assume the operating position, and which, in the operating position, extends at least partially at least from the first blade head section to the second blade head section, the first blade head section comprises a first blade head section through hole through which the safety member extends, so that an end of the safety member is connected with the grip, and another end of the safety member extends into a second blade head section through hole in the second blade head section.

2. The haircutter according to claim 1, wherein actuating the operating member causes the locking mechanism to shift from the release position to the operating position, to couple the blade head sections to one another.

3. The haircutter according to claim 1, wherein the locking mechanism is operated by means of a rotary motion of the operating member.

4. The haircutter according to claim 1, wherein the operating member is provided by an elongated part section of the grip.

5. The haircutter according to claim 4 wherein the operating member is provided by the grip itself.

6. The haircutter according to claim 1, wherein the locking mechanism is configured to secure the second blade head section in a force fit to the first blade head section.

7. The haircutter according to claim 1, wherein the locking mechanism is configured to secure the second blade head section in a form fit to the first blade head section.

8. The haircutter according to claim 1 wherein the locking mechanism is configured to move the second blade head section to the operating position in a linear movement with respect to the first blade head section.

9. The haircutter according to claim 1 wherein the locking mechanism is configured to move the second blade head section to the operating position parallel to the plane of the first blade head section.

10. The haircutter according to claim 1 wherein operational attachment of the grip to the first blade head section causes the locking mechanism to simultaneously fix the second blade head section to the first blade head section.

11. The haircutter according to claim 1 wherein for releasing the second blade head section from the first blade head section, the safety member is released from the second blade head section by means of the operating member.

12. The haircutter according to claim 1, wherein the safety member comprises a threaded portion, which is screwed at least into the second blade head section by means of the operating member.

13. The haircutter according to claim 1, wherein the safety member is non-rotatably connected with the operating member.

14. The haircutter according to claim 1, wherein the safety member is non-rotatably connected with the grip.

15. The haircutter according to claim 1, wherein the grip is removably attached to the first blade head section by means of the safety member.

16. The haircutter according to claim 1, wherein the grip is removably attached to the second blade head section by means of the safety member.

17. The haircutter according to claim 1, wherein the first blade head section through hole is configured unthreaded and/or showing oversize in relation to the other end of the safety member, so that the other end of the safety member is passed through the first blade head section through hole without any screwing motion.

18. The haircutter according to claim 1, wherein the safety member comprises a threaded portion at least in sections.

19. The haircutter according to claim 12, wherein at least sections of the threaded portion of the safety member are coaxially disposed in the grip.

20. The haircutter according to claim 1, wherein the locking mechanism clamps the second blade head section relative to the first blade head section.

21. The haircutter according to claim 1, wherein the blocking device comprises at least one biasing device, which is configured to urge the second blade head section away from the first blade head section by means of spring force.

22. The haircutter according to claim 1, wherein the blocking device comprises a form grip device including a form grip member in the first blade head section, and a form grip member in the second blade head section, and wherein the form grip members of the first and the second blade head members are clamped to one another by transferring the locking mechanism to the operating position, so that the first and second blade head sections are locked to one another in a form fit.

23. The haircutter according to claim 22, comprising an adjusting device for aligning the haircutting blade in the blade head, wherein the adjusting device comprises an adjusting unit in at least partial engagement in a recess in the haircutting blade, and wherein the adjusting unit is provided by one of the form grip members.

* * * * *